United States Patent
Matiere

[19]

[11] Patent Number: 5,904,185
[45] Date of Patent: May 18, 1999

[54] CONDUIT FOR THE CIRCULATION OF FLUID

[75] Inventor: Marcel Matiere, Aurillac, France

[73] Assignee: Société Civile de Brevets Matière, Aurillac, France

[21] Appl. No.: 08/765,422

[22] PCT Filed: Jun. 28, 1995

[86] PCT No.: PCT/FR95/00868

§ 371 Date: Dec. 30, 1996

§ 102(e) Date: Dec. 30, 1996

[87] PCT Pub. No.: WO96/00867

PCT Pub. Date: Jan. 11, 1996

[30] Foreign Application Priority Data

Jun. 29, 1994 [FR] France ................................. 94 08030

[51] Int. Cl.[6] ............................................... F16L 9/00
[52] U.S. Cl. .......................... 138/157; 138/106; 138/175; 138/178; 405/155; 405/157
[58] Field of Search ..................... 138/157, 106, 138/105, 155, 156, 171, 175, 176, 103, 178, 167; 405/124, 125, 126, 134, 135, 154, 155, 157

[56] References Cited

U.S. PATENT DOCUMENTS

| | | | |
|---|---|---|---|
| 822,047 | 5/1906 | Hooper et al. .................... 138/106 X |
| 950,149 | 2/1910 | Dujardin ............................. 138/157 X |
| 1,982,995 | 12/1934 | Lane ........................................ 138/106 |
| 2,702,564 | 2/1955 | Busch . | |
| 4,735,234 | 4/1988 | Matiere .................................. 138/105 |

FOREIGN PATENT DOCUMENTS

| | | |
|---|---|---|
| 0 392 912 A3 | 10/1990 | European Pat. Off. . |
| 935451 | 6/1948 | France . |
| 2 599 783 A1 | 12/1987 | France . |
| 21275 | 9/1985 | United Kingdom ................... 135/106 |
| 2 174 472 | 11/1986 | United Kingdom . |

*Primary Examiner*—William Stryjewski
*Attorney, Agent, or Firm*—Pollock, Vande Sande & Amernick

[57] ABSTRACT

A conduit for the circulation of fluid under pressure comprising a tubular enclosure delimited by a thin wall and fixed on a rigid base slab of molded material. The upper part of the enclosure comprises, in cross-section, at least three thin wall segments, including two lateral segments each extending from a lower side to an upper side, and at least one upper segment closing the enclosure by connecting the upper sides of the lateral segments. Each lateral thin wall segment is joined to a rigid support element of molded material fixed at its base to the corresponding side of the slab and comprising an inner surface conjugate with that of the lateral segment onto which the latter is applied. The inner surface extends from the level of the upper surface of the slab as to a level sufficient to maintain the rigidity of the lateral segment over its entire height.

21 Claims, 3 Drawing Sheets

CONDUIT FOR THE CIRCULATION OF FLUID

FIELD OF THE INVENTION

The invention relates to the construction of conduits with very wide sections in particular for the transport of a fluid under high pressure which may, for example, exceed ten bars. The invention applies especially to the construction of forced conduits for hydroelectric stations, water supply and sewage circuits, but may also apply to the transport of gas under pressure, for example towards gas pipe-lines or to urban heating systems.

BACKGROUND OF THE INVENTION

In general, a wide section conduit is formed by an extended tubular enclosure which may be made of molded material such as concrete or of metal. If the conduit has to resist high internal pressure, it is advantageous for its construction to be in metal as it may then be made of relatively light, easy to handle juxtaposed panels which may be welded together to form a closed tubular casing with, generally, a circular section, and which resists particularly well tensile stress generated by the application of internal pressure.

Forced conduits used in hydroelectric installations are generally made in this way.

However, the conduit must, normally, be laid on the ground, generally using spaced supports and, while it has good resistance properties when subjected to internal pressure, it also has a propensity to distort when there is no pressure, during assembly or even simply in the event of reduced pressure. Such distortion leading to ovalization of the conduit is an impediment, particularly during assembly of the different panels which, in order to avoid such distortion, must normally be mounted on a template of the desired section before being soldered.

The risk of distortion is even higher with very wide sections, for example of several square meters. Tubular components in reinforced concrete can be used which offer the advantage of keeping their shape when laid on the ground and banked, but for wide sections such components are heavy and cumbersome. Also, circular section conduits which simply rest on their lower surface exert considerable localized stress on the ground which may, through a boring effect, lead to differential subsidence and therefore disturbances. Also, it is difficult to form joints between adjacent components that are sufficiently leakproof to withstand very high pressure.

To solve such problems, the inventor has already described, in -FR-A-2,685,304 the construction of mixed conduits made of a metal tubular enclosure having a cross-section that is circular shaped on one part with a substantially level lower part which is applied and fixed on a slab of reinforced or prestressed concrete. In this manner, such a conduit combines the advantages of metal construction and concrete construction since the metal circular part is only subjected to tensile stress and may therefore be made of a relatively thin wall, whereas the lower part is applied to the slab which can be designed to withstand flexion stresses thus generated and which, also, distributes load over a wide surface area which reduces the stresses applied to the ground and risks of subsidence.

-FR-A-2,685,304 describes several particularly advantageous methods of construction.

This type of conduit fully withstands internal stresses exerted, in service, by the fluid transported even under very high pressure. However, it may be also be subjected to external stresses exerted, for example, by the filling under which the conduit is buried or simply by atmospheric pressure when internal pressure is reduced or cut off.

For better resistance against external stresses, -FR-A-2, 685,304 proposes giving the conduit a half-round shape. However, the diameter of such a conduit is evidently double the diameter of a circular section conduit for the same flow rate. The conduit passage and consequently the width of the trench in which it is laid are therefore increased.

As indicated in patent FR-A-2,685,304 it is possible in certain cases to approximate a circular section as far as possible to cover a sector of more than 180° whose area, for example, may reach three quadrants, the width of the concrete slab thereby being reduced.

However, by increasing the sector covered by the circular part, the risk of distortion is also increased, especially of the side panels during assembly, so that it is difficult to align these panels for welding, the use of a template being necessary in practice.

Also, this conduit must be placed on dug foundations whose levelling is not very precise. On-site handling and banking operations must be simplified as much as possible.

Also, even when the conduit is in service, mere reduction in internal pressure or even a mere hollowing effect may cause collapse of the metal part under the embankment load.

SUMMARY OF THE INVENTION

The invention brings a solution to such problems with a new method of construction which remedies the described disadvantages while maintaining the advantages of the known art.

The invention relates to the construction of a conduit for the transport of fluid under internal pressure comprising, generally, a tubular enclosure for fluid circulation limited by a thin wall applied on a rigid base slab of molded material, the enclosure being comprised of juxtaposed panels mounted along their adjacent sides and comprising, in its cross-section, a lower part applied and fixed to the rigid slab and an incurved arcuate upper part connecting to the lower part along two lateral sides fixed on the slab, the slab comprising an upper surface for fixing the tubular enclosure, a lower surface resting on the ground and two side surfaces.

In accordance with the invention, the upper part of the enclosure, in its cross-section, is formed of at least three segments of thin wall, namely two lateral segments each extending from a lower side to an upper side, and at least one upper segments closing the enclosure connecting to the upper sides of the lateral segments and Each lateral segment of thin wall is joined to a rigid supporting element in molded material fixed at its base to the corresponding side of the slab and extending upwards, each support element comprising an inner surface for application to the lateral segment having a profile conjugate with the latter and extending from the level of the upper surface of the slab to a level that is sufficient to maintain the rigidity of the lateral segment over its entire height without any risk of collapse even under the weight of the upper segment and in the absence of internal pressure.

In a particularly advantageous manner, the thickness of the thin wall is determined in relation to its ability to withstand both tensile stresses generated by the application of internal pressure and external forces exerted by trench filling or atmospheric overpressure. The height of the upper sides of the lateral segments is determined so that the upper segment spanning the upper sides may be constituted of a single, sufficiently rigid panel so that there is no risk of its collapse under its own weight when mounted on the side segments.

In a preferred method of construction, each support element, below the level of the upper surface of the slab and on the side of the latter, is limited by an inner lateral surface of which at least one part is applied against at least one corresponding part of the opposite lateral surface of the slab, the lateral surfaces having conjugated profiles.

Both support elements are advantageously placed on the ground on either side of the slab, each by means of a base with a level lower surface of sufficient width to enable the element to stand upright before being joined to the slab.

According to another advantageous provision of the invention, the two support elements placed on either side of the slab are joined to the latter either by anchor pegs or by prestress cables passing through sheaths provided inside the support elements. The slab during casting follows a profile that is substantially parallel to that of the corresponding parts of the enclosure, the prestress cables after tightening being stayed on support surfaces provided during casting on the support elements at the end-point of the sheaths.

To achieve leakproof assembly between the metal panels, the facing lateral edges of each lateral segment and the lower segment of the thin wall are separated by a certain distance from the joint plane leaving a space on either side of the latter into which a joint-cover is welded, after mounting, to the lateral segment and the lower segment so that the continuity of the enclosure wall is restored.

According to another advantageous characteristic, the upper segment of the thin wall closing the enclosure at the top is of greater width than the distance between the upper parts of the lateral segments so that it overlaps the latter over a certain distance and two lines of welding are made, after assembly, on both the inner and outer surfaces of thin wall along the upper edges respectively of each lateral segment and upper segment.

BRIEF DESCRIPTION OF THE DRAWINGS

The invention will be better understood with the following description of certain particular methods of construction given by way of illustration and shown in the appended drawings.

DESCRIPTION OF PREFERRED EMBODIMENT

Figure 1:
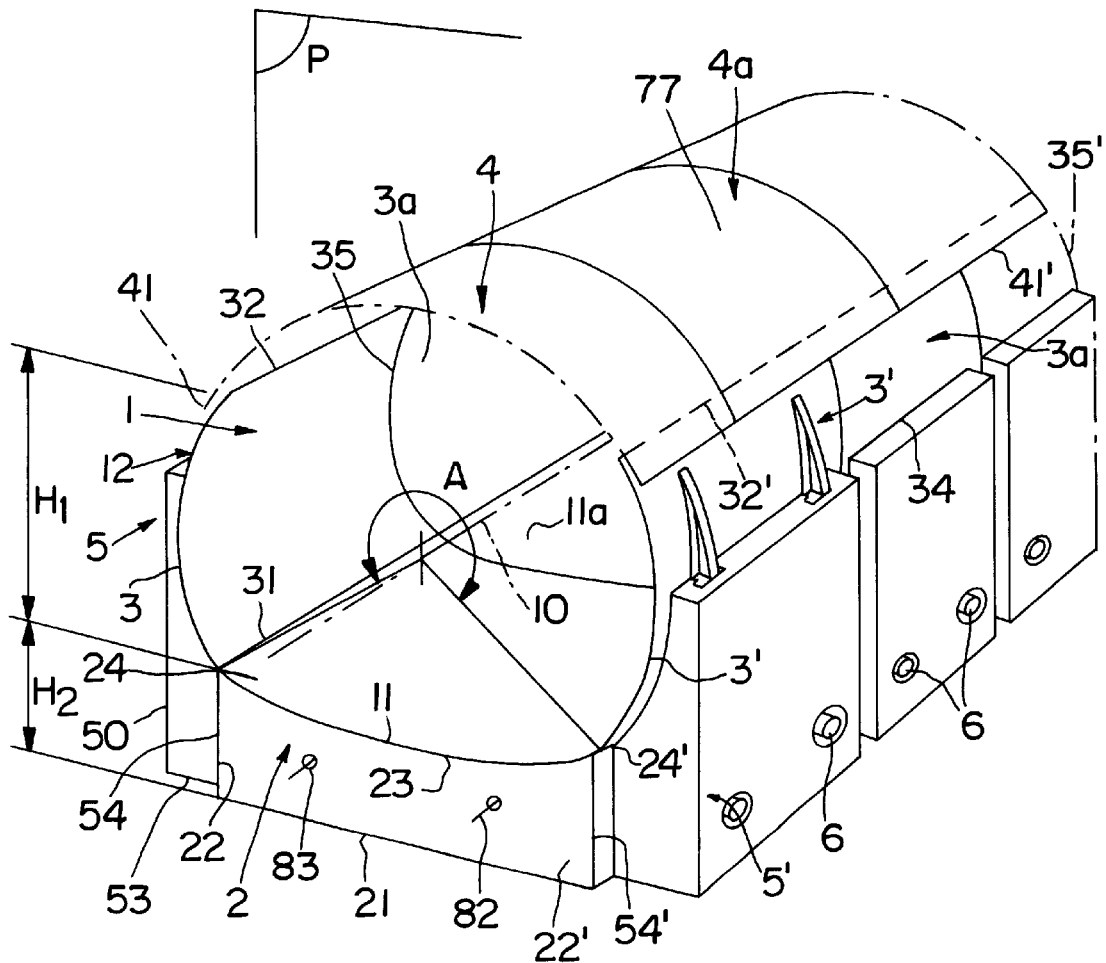
FIG. 1 is a perspective view of a length of conduit in accordance with the invention.

In FIG. 1 shows length of conduit according to the invention which comprises a metal tubular enclosure 1 fixed onto a rigid slab 2 in reinforced concrete comprising a level lower surface 21, two lateral surfaces 22, 22', and an upper surface 23.

The enclosure is laid on a levelled, compressed surface which may, for example, be the bottom B of a trench C, the enclosure being covered by filling material after construction.

The tubular enclosure 1 is limited by a thin metal wall, fully closed in its cross section, which comprises a lower part 11 applied to the upper surface 23 of slab 2 and an upper part 12 of cylindrical shape centred on a longitudinal axis 10.

The lower part 11 which runs between the two lateral edges 24, 24' of slab 2 is level or slightly incurved. The upper part 12, in its cross section, covers a circular area and extends between the two lateral edges 24, 24' at an angle A of more than 180°.

The metal tubular enclosure 1 is made of juxtaposed panels soldered along their adjacent sides, which, normally, in cross-section, cover four segments of wall, i.e., one lower segment 11 extending the length of slab 2 between the two lateral edges 24,24' of the slab, and three segments 3,3',4, constituting the upper part 12 of the enclosure, including two lateral segments 3, 3' and an upper segment 4.

Each lateral segment 3, 3' rises vertically between a lower edge 31 extending the length of the corresponding lateral edge 24 of the lower part 11, and an upper edge 32, located at a height H1 above lateral edge 24.

The upper element 4 covers an arch whose span is slightly greater than the distance between the upper edges 32, 32' of lateral segments 3, 3' so that the ends 41,41' of the upper segment 4 overlap by a certain distance the ends 32, 32' of lateral segments 3, 3'.

The upper segment 4 thus forms a metal dome resting on the two lateral segments 3, 3' which may be suspended from a leverage bar either by clips that fix onto lateral edges 41,41' or by hooks hooked onto anchor points provided for this purpose on the metal dome.

The height H1 of the upper ends 32 of the lateral segments 3 is so determined that the distance D between the lateral ends 41, 41' of the dome is sufficiently short to avoid excessive distortion of the latter under its own weight, taking into account the type of metal which constitutes the metal wall, its thickness and its rigidity.

In accordance with the major characteristic of the invention, each lateral segment 3, 3' is applied to a support element 5,5' made of an extended length of reinforced and/or prestressed concrete that can be placed adjacent to slab 2 and comprises an incurved surface 51 whose profile is conjugate with that of lateral segment 3, which can therefore be applied and fixed to support element 5 along the entire length of surface 51. The latter extends over the major part of the length of lateral segment 3 from its lower end 31. In this manner, only a short length 33 of lateral segment 3 rises upwards from the upper end level 52 of support element 5 and as far as the upper end 32 of element 3. The height H2 of the support surface 51 is determined in such manner as to maintain the rigidity of the lateral segment 3 over its entire height, the length of the overhanging end 33 being sufficiently short so that it does not distort even under the weight of the upper dome 4.

If required, support clamps 34 in the shape of incurved corner-bars could be bolted onto the upper surface 52 of support element 5 to maintain the rigidity of the end 33 of lateral segment 3.

With this method of construction, slab 2, like the support elements 5, 5', is made of prefabricated parts placed end to end. The segments of thin wall 3,11 may be joined, during casting, to the parts in concrete 5,2 which are advantageously flat cast. Each metal surface 3,11 therefore constitutes the casting base and is fitted with projecting anchor points 17 which are sunk in the concrete during casting. After casting, the concrete element fitted with the corresponding metal surface is inverted to constitute slab 2 or placed upright to constitute a support element 5, 5'.

Such a conduit may be constructed as work advances in successive lengths, in the following manner:

incurved elements of thin wall are cut and shaped covering respectively at least four segments of the circumference of the tubular enclosure 1, namely two lateral segments 3, a lower segment 11 and an upper segment 4, in advance, and in required numbers, two types of prefabricated elements are prepared in reinforced concrete and are each fitted on one surface with a segment of thin wall constituting one-off shuttering embedded in the concrete, namely elements of slab 2 in reinforced concrete covered by a lower segment 11, and support elements 5 having an incurved surface covered by a lateral segment 3, these prefabricated elements having been delivered on-site in required numbers to build a new length of conduit to continue the part already built, an element of slab 2 is positioned on the laying surface B with two support elements 5, 5' aligning them with the corresponding elements of the part already laid and by applying the other the facing lateral surfaces of support elements 5 and slab 2, welding is carried out both between the segments 11, 3, 3' of the length which has just been laid along the lower sides 31, 31' and upper sides 32, 32', in the transverse junction plane P, between each segment 3, 11 of the new length and the corresponding segments 3a, 11a of the part already laid, along their adjacent sides.

the upper segment of wall 4 is placed on the upper ends 32, 32' of lateral segments 3, 3' and is soldered longitudinally to lateral segments 3, 3' and transversely to the upper segment of the part already laid.

Preferably, each support element 5 rests directly on the ground on its level surface 53 and is provided, below the application surface 51 of segment 3, with a support surface 52 which is applied against the corresponding lateral surface 22 of slab 2.

The support elements 5 can be applied against slab 2, for example, by means of a number of pegs 6 passed through openings 60 provided in the lower part of support elements 5,5' whose ends 61 screw into threaded bores 62 made of inserts which are embedded during casting to the sides of slab 2. It is also possible to use rods crossing through the entire unit formed by slab 2 and the two support elements 5.

In the simplest method of construction shown in FIG. 1, the two lateral surfaces 22, 22' of slab 2 are level, as are the support surfaces 52,52' of support elements 5, 5'.

Figure 2:
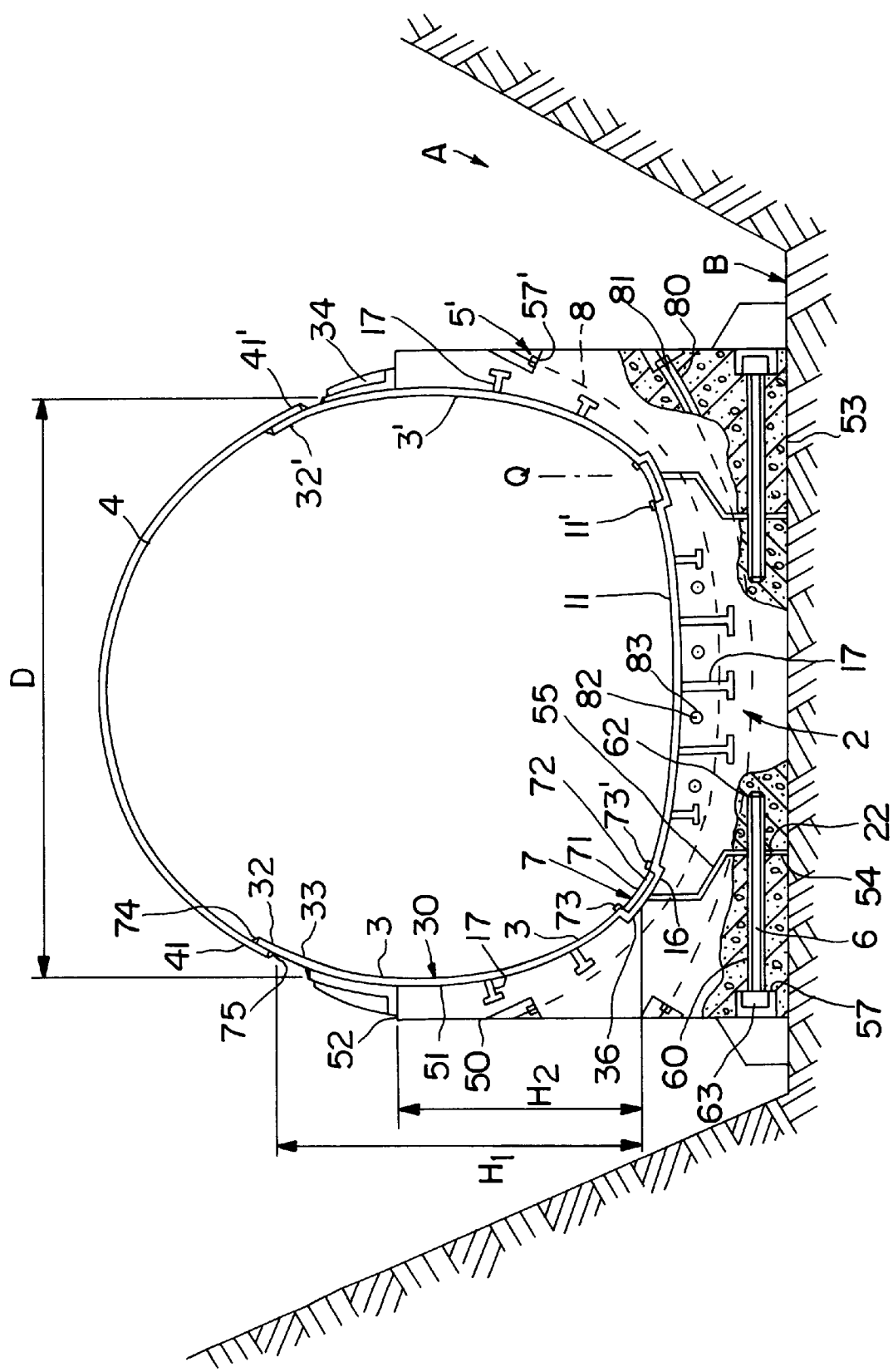
FIG. 2 is a cross-section view of such a conduit under a preferred method of construction.

FIG. 2 shows an improved method of construction in which the lateral surfaces 22, 22' of slab 2 and the conjugate surfaces 52, 52' of support elements 5 have a staggered profile comprising, in its central part, inclined or horizontal surfaces, respectively 25,55 which interlock to prevent relative movement of the support elements in relation to the slab.

It will be noted that the staggered surfaces 22, 52 may advantageously be reinforced by metal walls which serve as one-off shuttering and assure the perfect application of the two conjugate surfaces one on another, and, avoid deterioration risks during the handling of prefabricated components.

With the above provisions, the support elements 5, 5' are perfectly held in place by interlocking with the sides of slab 2, with no risk of displacement in relation to the latter which creates favorable welding conditions for assembly with lateral segments 3, 3' and the lower segment 11 of the thin wall.

To improve this junction, it is advantageous to terminate the lower edge 31 of each lateral segment 3, 3' and the opposite edge 11' of lower segment 11 a certain distance away from either side of joint plane Q between the slab and the support element, in such manner as to leave two aligned slots 36,16 of substantially similar thickness to that of the thin wall in which a joint-cover 7 is placed made of a metal strip of the same thickness and angled to form two wings 71,72 connecting tangentially to respectively the lower end of lateral segment 3 and the corresponding, end of lower segment 11 of the thin wall.

As indicated in FIG. 2, the two sides 36,37 of the slot may be made of cranked parts provided along the ends facing the thin wall segments 3, 11.

In this way, each joint-cover 7 assures the continuity of the metal wall, the only inward projection being welding lines 73,73' made between the lateral edges of joint-cover 7 and the inner edges of the cranked parts, respectively 36,16 of lateral segment 3 and lower segment 11.

Along the transverse joints 35 between the adjacent elements, the metal segments may be welded end to end. In particular, as shown in FIG. 1, the concrete support element 5 need not necessarily cover the entire length of the corresponding metal wall 30, and the latter may therefore extend beyond the ends to facilitate welding.

Figures 3, 4:
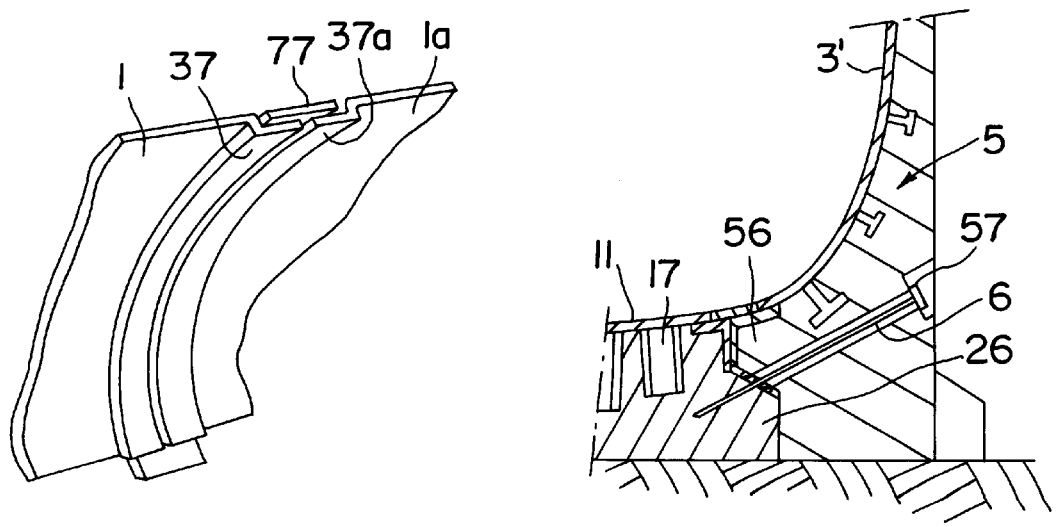
FIG. 3 is a detailed perspective view of a transverse assembly joint.
FIG. 4 and FIG. 5 are detailed cross-section views showing other methods of joint assembly between a support element and the slab.

But it is also possible, as shown in FIG. 3, to provide cranked parts 37 37a on the ends opposite adjacent segments 3,3a,11, 11a to limit a slot in which is placed a joint-cover strip 77. This strip may be placed on the outside to facilitate its assembly or on the inside like the longitudinal strips 71 if it is wished to avoid projecting parts inside the conduit To avoid cross welding, it is possible to stagger the transverse joint planes both between lateral segments 3, 3a and between upper segments 4, 4a and lower segments 11, 11a.

It is to be noted that the application on one another of lateral surfaces 22,52 of the slab and support elements may only be made through one part 22a,52a of these surfaces in which openings are provided for pegs 6 with interpositioning of a compressible gasket 64 surrounding the peg.

Each peg 6 is preferably perpendicular to application surfaces 22a,52a as shown in FIG. 2. However, it may be advantageous, in certain cases, to incline peg 6 in relation to application surfaces 22a, 52a, as shown in FIG. 4.

To lighten slab 2 and to improve its resistance to flexion stresses generated by the application of internal pressure, it is advantageous to subject it to transverse prestress.

In this case, pegs 6 serve essentially for the provisional maintained of support elements 5 which are definitively joined to slab 2 by prestress cables 8 which surround the lower part of the conduit by passing through sheaths 80 in-built during casting in slab 2 components and support elements 5 and which connect tangentially in joint planes. Each prestress cable 8 is fitted with an anchor head 81 which is stayed on a corresponding surface 57 provided on the outer side of support element 5 perpendicular to the direction of the cable at the exit of the latter Also, sheaths 83 parallel to axis 10 of the conduit may be provided in slab 2 and, if necessary, in support elements 5 to allow the passage of cables 82 which, after tightening, join together adjacent conduit lengths with overall longitudinal prestress providing, in particular, for better resistance to differential subsidence.

On the upper part, as previously indicated, each dome 4 element merely offers a width that is greater than the distance between the upper ends 32, 32' of lateral segments 3, 3' so that it overlaps the latter, and welding lines 74,75 are provided on the inside along edges 32, 32' and lateral segments 3, 3', and on the outside along edges 4, 4' of dome 4.

To improve the stability of support elements 5, it may be advantageous to provide the latter, at their base, with shoe-shaped parts which extend outwards to widen the lower surface 53 of each element 5.

Also, such shoes improve the stability of support element 5 by preventing it from falling outwards before it is banked.

In another method of construction using the so-called "confined concrete" technique, each slab 2 component is limited on all its surfaces by a closed metal wall covering not only upper surface 11, but also lower surface 21 and lateral surfaces 22, so as to constitute a hollow caisson which is filled with concrete under slight overpressure to compensate withdrawal. In this case, the reinforcements may dispensed with as they are replaced by the walls of the caisson.

Slab 2 may also be cast on-site, as work progresses, between two shutterings or between internal surfaces 52, 52' of support elements 5, 5'. In this case, the lower part 11 of the metal wall may be made of cut segments which are applied to the concrete before it is set. The previously cast concrete slab may also be provided with hollow spaces filled with mortar into which are inserted anchor parts welded to the lower surface of each wall segment 11, filling cement then being injected between the metal segment and the upper surface 23 of the slab to assure interlocking and the transmission of pressure forces.

In such a case, for example, after constructing a certain length of conduit and preparing a levelled laying surface for its continuation, firstly support elements 5, 5' are positioned, fitted respectively with lateral segments 3, 3' aligning them with the part already laid, and the adjacent lateral segments are welded along their transverse edges 35. Then the ironwork of slab 2 is placed in position, and, when applicable, the prestress sheaths that are placed in line with the corresponding sheaths provided in side elements 5, 5'. The concrete slab is then cast and lower segment 11 is embedded therein. The prestress cables are then positioned and tightened and, the different elements being properly applied, segment 11 is welded along its transverse edge 15 to segment 11a of the part already laid and along its lateral edges to edges 31 of the lateral segments 3, 3'.

Dome 4 can then be positioned and welded to dome 4a already in position and to lateral segments 3, 3'.

The staggered profile of lateral surfaces 22, 52, of slab 2 and of support elements 5, 5' could also be inverted as shown in FIG. 4, slab 2 in this case being fitted with lower rims 26 which pass under the upper rims 56 of support element 5. With this configuration, it is possible, when building a new length of conduit, to position firstly one or several slab components to continue the part already laid by connecting them to the latter, possibly with prestress bars, and then laying the required number of support elements 5, 5' either side of the slab to constitute a reference construction line.

Figure 5:
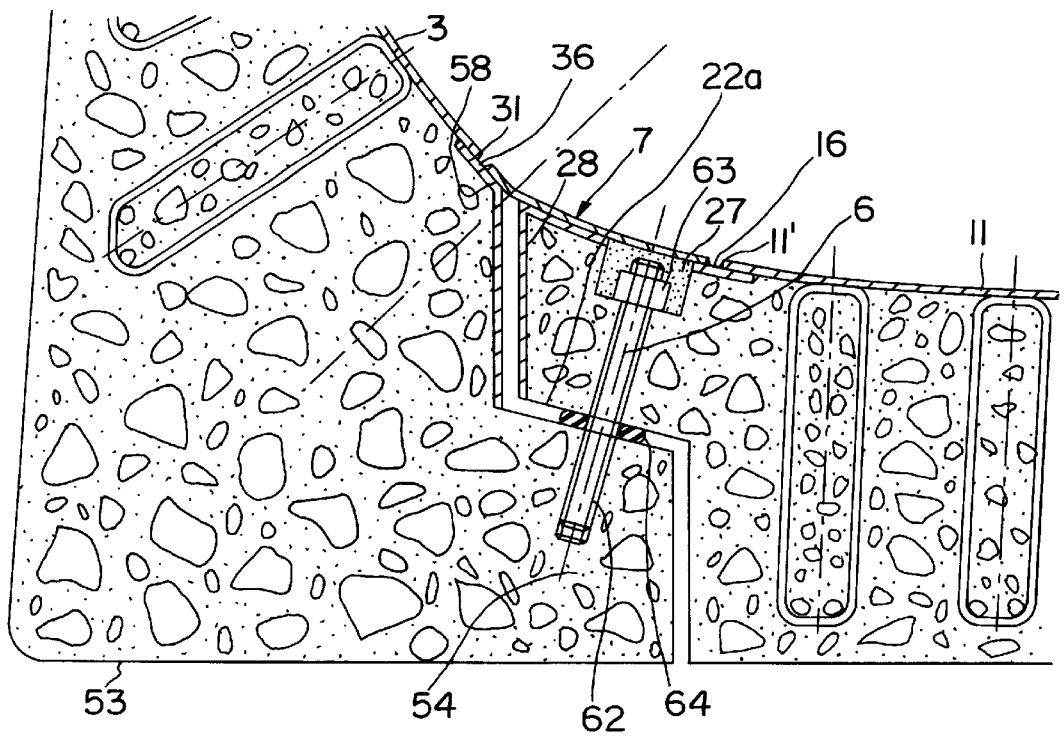

As indicated in FIG. 5, the lateral edges facing each support element 5, 5' and slab 2 may be covered by corner protections, which constitute one-off shuttering and on which are welded ends 31, 11' of wall segments 3, 11 which are terminated at a certain distance from joint plane Q to provide the two sides 36,16 with a slot in which the joint-cover 7 is placed.

Figure 6:
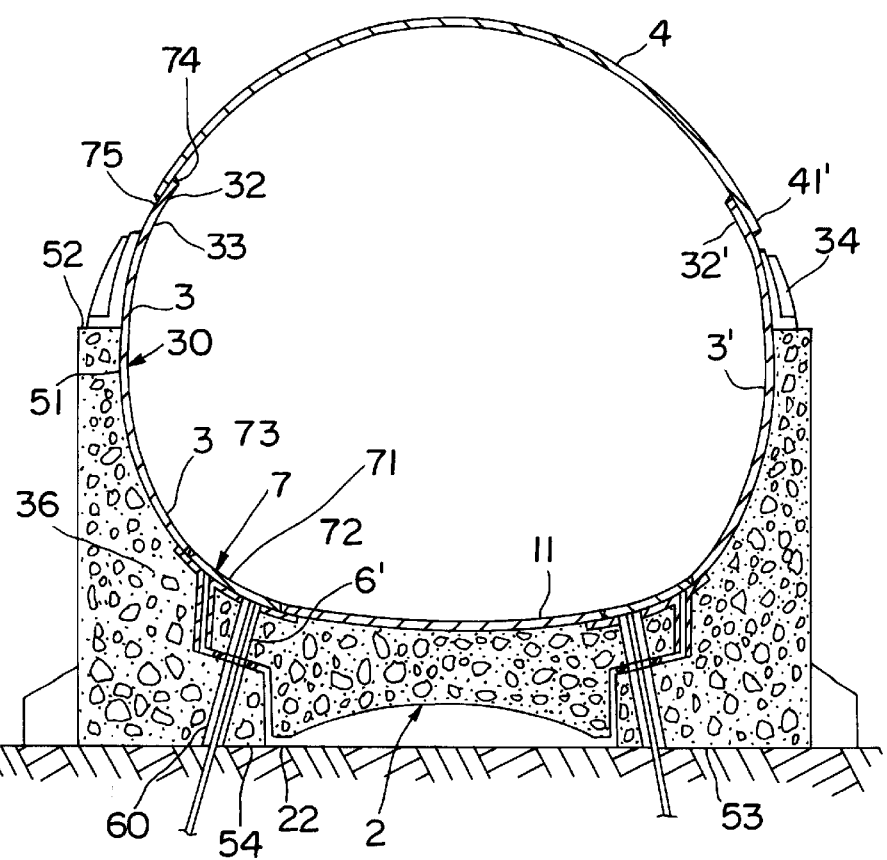
FIG. 6 is a cross-section view of another method of construction of the conduit.

It may also be advantageous, in particular to reduce the width of trench C, to mount pegs 6 from inside the conduit, as shown in FIGS. 5 and 6.

In this case, to construct a new length of conduit, the two support elements 5, 5' are first positioned in line with the corresponding components of the part already laid. Support elements 5, 5' are fitted with lower rims 54 in which were embedded inserts 62 with inner threading.

After placing joints 64 at the outlet of each insert 62, slab components 2 are laid which interlock between support elements 5 5' and which have openings 60 in line with inserts 62.

Pegs 6 are then placed in position whose head 63, which may be a screw, is housed in a slot 27 provided in the upper surface of slab 2.

After tightening pegs 6, joint-cover 7 is placed in position and welded to corner protections 28,58.

In the event of strong landslide risks, upper segments 4 may be mounted on lateral segments 3, 3' as soon as slab 2 components are laid so that on-site workers may be protected during peg fixing and joint welding operations.

According to another advantageous feature shown in FIG. 6, the passage openings 60 of pegs 6 cross entirely through slab 2 and support elements 5. After placing prefabricated components in position, it is possible to make boreholes in the ground in which tie-rods 6' of long length are embedded. Such provision may be used, for example, in the event that the conduit passes through underground water and there is a risk that the ballast effect provided by support elements 5, 5' and slab 2 does not sufficiently compensate for the Archimedes thrust.

As FIG. 6 shows, it is also possible for slab 2 to be less thick than lateral surfaces 52 of support elements 5, 5', so that slab 2 does not rest on the ground but only on support elements 5, 5' by means of upper rims 26a. The profile of slab 2, in cross-section, in this case need only be designed so that it may, taking into ironwork, be able to withstand flexion stresses applied by lower segment 11 subjected to the pressure prevailing within the enclosure.

I claim:

1. A conduit for the circulation of fluid under internal pressure, comprising a tubular enclosure delimited by a thin wall and fixed on a rigid base resting on a laying surface:
    (a) said rigid base being made of molded concrete material and comprising a slab having an upper surface and two support elements each fixed at its base to a corresponding side of the slab and having an inner surface facing the enclosure above the level of said upper surface;
    (b) said tubular enclosure being constituted by a plurality of juxtaposed panels each forming a thin wall and comprising, in cross section, at least four segments, namely, a lower segment which is applied and fixed to the upper surface of the slab, two lateral segments, each extending from a lower side to an upper side, and at least one upper segment connecting to the upper sides of said lateral segments for closing the tubular enclosure;
    (c) each lateral segment being applied and fixed on the inner surface of a corresponding support element;
    (d) each inner surface having a profile conjugate with that of the lateral segment on which the latter is applied, and extending from a level of the upper surface of the slab to a level of height sufficient to maintain the rigidity of said lateral segment over its entire height without risk of collapse even under the weight of the upper segment and in the absence of internal pressure.

2. The conduit according to claim 1, wherein the thickness of the thin wall is determined as a function of the ability of the thin wall to withstand tensile forces generated by application of internal pressure, and wherein the height of the upper sides of the lateral segments is so determined that the upper segment spanning the upper sides is comprised of a single panel sufficiently rigid to avoid a risk of collapsing under its own weight when mounted on the lateral segments.

3. The conduit according to claim 1, wherein both support elements rest on the ground on either side of the slab, each by means of a base with a level lower surface.

4. The conduit according to claim 1, wherein each support element is delimited, below the level of the upper surface of the slab and on the side of the slab by an inner lateral surface at least part of which is applied against at least one corresponding part of the opposite lateral surface of the slab, said lateral surfaces of the slab and of the support elements having conjugate profiles.

5. The conduit according to claim 4, wherein each support element is combined with means for joining support elements to the slab by applying one to another at least corresponding parts of the conjugate lateral surfaces.

6. The conduit according to claim 5, wherein the means of joining the two support elements to the slab are comprised of a number of transverse prestress cables passing through aligned sheaths provided inside the support elements and the slab during casting and following a profile substantially parallel to that of the corresponding parts of the enclosure, said prestress cables being held, after tightening, on stay surfaces provided on the support element during casting at the exit of the sheaths.

7. The conduit according to claim 5, wherein the means for joining the support elements to the slab comprise a plurality of pegs extending transversely as far as the conjugate application parts of said lateral surfaces and distributed over the length of each support element, each peg being stayed at one end on a support element and at the other end on the slab.

8. The conduit according to claim 7, wherein each interlocking peg passes through a line of openings provided in the support element and the slab and comprises an inner end embedded in the slab and a stay head stayed on the support element.

9. The conduit according to claim 8, wherein said pegs are positioned from the outside, each peg being supported by its head on the outer lateral surface of the support element.

10. The conduit according to claim 4, wherein the central parts of conjugate lateral surfaces of the support elements and of the slab comprise an application part forming an angle of less than 45° with a horizontal line.

11. The conduit according to claim 10, wherein the internal lateral surface of each support element comprises, at its base, a lower projecting rim which inserts below a corresponding rim provided in the upper part of the corresponding lateral surface of the slab.

12. The conduit according to claim 11, wherein the slab has a thickness of less than a distance between the lower part of the wall and the ground, and is supported, by its upper rims, on two adjacent support elements.

13. The conduit according to claim 10, wherein the tie pegs are placed from within the inside of the enclosure and cross through the application parts, each tie peg being supported by its head on the upper surface of the slab.

14. The conduit according to claim 13, wherein the tie pegs are extended so that they reach and are embedded in bore-holes provided in underlying ground.

15. The conduit according to claim 1, wherein the lower edge of each lateral thin wall segment and the corresponding lateral edges of the lower segment applied to the slab are separated over a certain distance from the joint plane between the support element and the slab leaving, on either side of said joint plane, a slot covered by a joint-cover which is welded, after mounting, to the lateral segment and lower segment in such manner as to restore continuity of the inner surface of the enclosure.

16. The conduit according to claim 15, wherein the ends opposite each lateral segment and lower segment are provided with cranked parts delimiting the slot in which the joint-cover is placed.

17. The conduit according to claim 1, wherein the upper thin wall segment closing the enclosure at the top is of greater width than the distance between the upper ends of the lateral segments, so that it overlaps the latter over a certain distance, two lines of welding being made after assembly on both the inner and outer thin wall surfaces along the ends, respectively, of each lateral segment and upper segment.

18. A method of construction of a conduit for transport of a fluid laid on a levelled, compressed surface made of a tubular enclosure delimited by a thin wall and fixed on a rigid base slab of molded material, said method comprising the steps of:

(a) cutting and shaping incurved thin wall components covering respectively at least four segments of a circumference of the tubular enclosure, namely, two lateral segments, a lower segment and an upper segment;

(b) preparing in advance and in required numbers two types of prefabricated elements in reinforced concrete each fitted on one surface with a thin wall segment constituting one-off shuttering embedded in the concrete, namely, slab elements of reinforced concrete covered by a lower segment, and support elements having an incurved surface covered by a lateral segment;

(c) these prefabricated elements having been delivered on-site in required numbers to construct a new length of conduit to continue the part already laid, positioning on the laying surface a slab element and two support elements in line with corresponding elements of the part already laid and applying facing lateral surfaces of the support elements and the slab to one another;

(d) welding both between segments of the length that has already been laid, along the lower and upper sides and, in the transverse junction plane between each segment of the new length of conduit and the corresponding segments of the part already laid along their adjacent sides;

(e) mounting the upper wall segment on upper ends of the lateral segments and welding the upper segment longitudinally to the lateral segments and transversely with the upper segment of the part already laid.

19. The method according to claim 18, including first placing both support elements on the laying surface on either side of the longitudinal axis of the conduit and positioned in line with the corresponding elements of the part already laid, and then placing the slab element between said support elements.

20. The method according to claim 18, wherein in the event of landslide risks the upper segment is first mounted on the ends of the lateral segments, and then positioning all welding operations inside the enclosure thus closed.

21. A method of construction of a conduit for transport of a fluid laid on a levelled, compressed surface and comprising a tubular enclosure delimited by a thin wall and fixed on a rigid base slab of molded material, said method comprising the steps of:

(a) cutting and shaping incurved thin wall elements covering respectively at least four segments of a circumference of the tubular enclosure, respectively two lateral segments, a lower segment and an upper segment;

(b) preparing in advance and in required numbers support elements prefabricated in reinforced concrete each having an incurved surface on which is applied and embedded a lateral segment of thin wall constituting one-off shuttering;

(c) these prefabricated elements having been delivered in required numbers on-site to construct a new length of conduit to continue the part already laid, positioning on the laying surface support elements in line with corresponding elements of the part already laid;

(d) support elements thus being laid and aligned over a certain distance, casting a corresponding length of slab between the lateral surfaces of support elements and embedding lower thin wall segments on said slab;

(e) welding between segments of the length of conduit just laid, along the lower and upper sides and, in a transverse junction plane, between each segment of the new length and the corresponding segments of the part already laid along adjacent sides;

(f) mounting the upper segment of wall on the upper ends of lateral segments and welding said upper segment longitudinally to lateral segments and transversely to the upper segment of the part already laid.

* * * * *